UNITED STATES PATENT OFFICE.

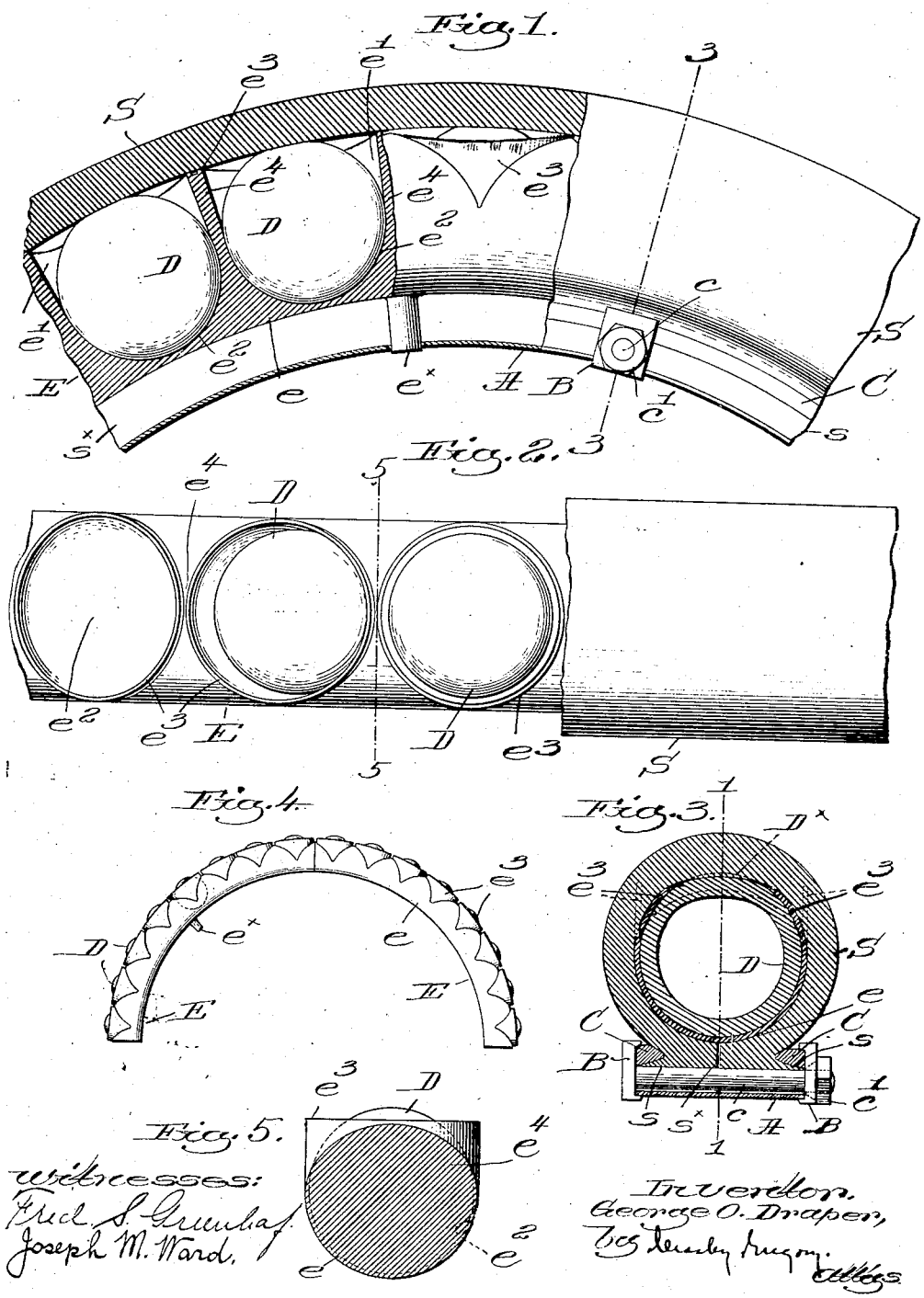

GEORGE OTIS DRAPER, OF HOPEDALE, MASSACHUSETTS.

RESILIENT TIRE FOR VEHICLES.

941,015.  Specification of Letters Patent. Patented Nov. 23, 1909.

Application filed April 5, 1909. Serial No. 487,922.

*To all whom it may concern:*

Be it known that I, GEORGE OTIS DRAPER, a citizen of the United States, and resident of Hopedale, county of Worcester, State of Massachusetts, have invented an Improvement in Resilient Tires for Vehicles, of which the following description, in connection with the accompanying drawing, is a specification, like letters on the drawing representing like parts.

This invention has for its object the production of a novel resilient tire for the wheels of vehicles, particularly adapted for use in connection with automobiles, the tire embodying my present invention comprising an outside casing or "shoe" as it is commonly termed, and a peculiar and novel core inclosed within the shoe, to provide for the proper support and distension thereof.
Various schemes have been proposed heretofore for constructing a tire by putting inflated resilient balls within the shoe, and in some of those structures means have been provided for holding the balls, but so far as I am aware such tires have never advanced beyond the experimental stage. Such devices have been defective for the reason that, without a holding device to fill the interstices between the balls, no proper support was furnished to the shoe when in use, and when a holding device was used the character and construction thereof eliminated from the assembled tire the requisite resiliency.
In my invention the core comprehends a series of resilient members, preferably inflated balls, and a holder therefor, but I have obviated the objections hereinbefore noted by so constructing the holder that the said resilient members are properly supported at the inner side of the tire, that is, nearer the wheel rim or felly, while at the outer or tread side they are permitted to yield sufficiently to afford the necessary resiliency to the tire as a whole. There is no intermediate covering between the balls and the adjacent inner surface of the shoe, and the positioning and shape of the balls provide clearance spaces between them at the outer side of the core into which they can expand under pressure. I make the core of molded rubber, and of a cellular nature, to provide cells or pockets having their longitudinal axes radial to the center of the tire and opening outward, so that the balls inserted therein will bear directly against the interior of the shoe adjacent the tread portion thereof. Suitable means are provided to prevent longitudinal movement or "creeping" of the core, as will be explained hereinafter.

The various novel features of my invention will be fully described in the subjoined specification and particularly pointed out in the following claims.

Figure 1 is a side elevation and part longitudinal section on the line 1—1, Fig. 3, of a portion of a resilient tire embodying my invention, a short length only of the shoe being shown in elevation in order to more clearly disclose the structure of the core; Fig. 2 is a top plan view of the structure illustrated in Fig. 1, with the shoe omitted at the left hand side. Fig. 3 is a cross-section on the line 3—3, Fig. 1; Fig. 4 is a side elevation on a smaller scale of two segmental sections of the core, forming a semi-circle, with the shoe omitted; Fig. 5 is a transverse section through the core on the line 5—5, Fig. 2.

In Figs. 1 and 3 I have indicated the wheel-rim or felly at A, provided with shoe-clamping means of any suitable character, such as opposed clamping members B flanged to grip the rim and to overhang annular metallic retaining members C, arranged to seat upon the oppositely turned annular lips $s$ of the tire-shoe S and draw together its separated edges at the inner circumference of the shoe, as at $s^x$, Fig. 3, each pair of clamping members B being drawn together by means of a bolt $c$ and nut $c'$. This form of shoe and the means for clamping it upon the rim A constitute one of the so-called "quick detachable" tire devices of well known construction and not of my invention, but inasmuch as such construction is especially adapted for use in connection with the core invented by me I have illustrated it as forming a part of the completed or assembled tire. It will be understood that the pairs of clamping members are applied at intervals, the inner side of the shoe being transversely notched or recessed for the clamping bolts $c$, as usual.

The core of the tire, in accordance with my invention, comprises a series of resilient members D, preferably hollow and inflated balls of thick rubber, possessing strength and a high degree of resiliency combined with relatively light weight, and a holder E for said balls. This holder is preferably made in segmental sections, and conveniently of such length that when four are assembled end to end they complete the circle, each section being made of rubber and comprising a body portion $e$ provided with a series of pockets or cells $e'$ to receive the balls, the open end of each pocket being toward the outer or tread side of the shoe. The bottom of each pocket or cell is made semi-spherical, as at $e^2$, Fig. 1, to permit the ball to seat snugly and firmly therein, and the pocket is continued outward to its mouth by a relatively thin and flexible circular wall $e^3$ molded on the body $e$ of the core, the balls being normally of such diameter that when seated they will project above the tops of the cell walls $e^3$, as shown in Fig. 5. It will be seen from said Fig. 5, which is a transverse section taken between two adjacent cells, that the cells are separated from each other by transverse walls $e^4$ which are of substantially uniform thickness inward as far as the semi-spherical bottoms $e^2$ of the cells or pockets, and then gradually thicken, as shown in Fig. 1. The contiguous portions of two adjacent circular walls $e^3$ rise from the intervening transverse wall $e^4$ which separates the two cells corresponding to such circular walls. This cellular construction of the holder E serves to support and space apart the balls, with each one exposed at the outer end of its cell or pocket, Fig. 5, and while the tubular portions $e^3$ of the cells are flexible the inner ends or ball-seats $e^2$ thereof are formed in a very solid part or body $e$ of the holder. Thus the balls seat on a firm and relatively unyielding support, viz: the solid body of the holder, which is adjacent the inner circumference of the shoe S when the parts are assembled, while the outer circumferential portion of the core, adjacent the tread of the shoe, is relatively elastic and yielding, because of the exposed portions of the balls and the walls $e^3$ of their cells. Now the normal diameter of the balls, and the cross-sectional area of the body $e$ of the holder, is such that when the core is inclosed within the shoe and the latter is clamped down upon the rim the balls will all be subjected to sufficient pressure to flatten them and fold the outer ends of the cell walls $e^3$ over upon them, as shown by full lines Fig. 3. The exposed portions of the balls press directly upon the inner surface of the shoe S adjacent its tread portion, as will be apparent from Figs. 1 and 3, and as the flanged edges of the shoe are drawn together upon the rim A the balls are subjected to sufficient compression to flatten them and press them out more or less into the open ends of the cells or pockets, while the portions of the balls nearer the rim are firmly supported and held from distortion by the seats in the solid part of the holder and by the adjacent part of the shoe. This causes the balls to form a very resilient yet sufficiently firm support for the shoe adjacent its tread portion when the load is applied to the wheel, and the flattening of the balls increases the extent of surface on the shoe directly sustained thereby. More or less of the intervening parts are sustained by the compressed and folded over parts of the cell walls $e^3$, and the transverse walls $e^4$ provide additional support for the shoe at intervals throughout its extent.

While my improved tire is in a sense pneumatic, owing to the inflated balls of the core, it is not an inflatable tire, as that term is commonly employed, and it will be observed that I have done away with an inner tube, so that in case of puncture the tire is not rendered useless in whole or in part. That is, if the shoe is penetrated by a nail, or otherwise, between two of the balls there is absolutely no change in the action of the tire, for the penetrating device enters nothing in the core but solid rubber. If a ball be penetrated the air therein will escape, but the resiliency of the tire is not appreciably altered, for the support afforded by the other balls and by the parts of the body of the core nullify the effects of deflation of the penetrated ball. As a matter of fact several of the balls may be penetrated without putting the tire out of commission, and there can be no rim cutting under any circumstances.

When an ordinary pneumatic tire is punctured any further progress of the car with the deflated tire causes the shoe to flatten and bend against the edges of the rim, and the shoe is cut very quickly. With my tire this is not possible because of the solid character of the body $e$ of the ball-holder, which fills out the shoe to such an extent that it cannot flatten out and press against the wheel-rim.

There is no chance for a "blow out" with my improved tire, as will be manifest, and while the weight of the core is somewhat greater than the weight of the usual inner-tube this is more than compensated for by the puncture-proof properties of my tire and its other valuable features. I can also use a lighter shoe with my core than can be used with safety with an inflatable tube, so that the weight of my assembled tire is very little greater than an ordinary form of inflatable tire for a given size of wheel. The air spaces or clearances formed around the balls by the tubular ends of the cells afford ample opportunity for the balls to be distorted more or less when under pressure, and to more or less fill such spaces, see Figs. 1 and 3, without crowding upon each other, and the holder at all times maintains the balls properly spaced.

As best shown in Fig. 4, the longitudinal axes of the pockets or cells of the core are radial to the center of the wheel.

In Fig. 3 I have shown by dotted lines at $D^x$ the normal outline of the ball when uncompressed by the inclosing shoe.

It is convenient both in manufacture and for convenience in handling to make the ball-holders segmental, and so far as I am now able to state I believe that each holder should be a quarter-circle, its radius of curvature being of course determined by the diameter of the wheel to which it is to be applied.

To obviate any tendency of the core to move longitudinally or "creep" in the shoe I provide the ball-holder on its inner circumference with a projection or teat $e^x$ to enter the usual valve-hole in the shoe and rim, only one holder of a set being so arranged.

By reference to Fig. 3 it will be seen that a very considerable portion of the tread of the shoe at each side of its center line is sustained by direct engagement of the balls with the inner surface of the shoe, thereby effecting a better distribution of the pressure and resulting in easier riding properties for the tire.

The ball-holder can be made of low-grade, cheap rubber, readily molded to shape, and no change is required in the structure of the shoe for the application thereto of the core herein described.

Various changes or modifications in details of construction may be made by those skilled in the art without departing from the spirit and scope of my invention as expressed in the annexed claims.

Having fully described my invention, what I claim as new and desire to secure by Letters Patent is:—

1. The combination with a wheel rim provided with shoe-clamping means, and a shoe connected with the rim by said means, of a core for the shoe, comprising a holder and a series of inflated balls mounted therein, the normal cross-sectional area of the core being greater than that of the interior of the shoe, whereby the balls and adjacent portions of the holder are compressed by and within the shoe when the latter is acted upon by the clamping means.

2. The combination with a wheel rim provided with shoe-clamping means, and a shoe having annular lips at its inner circumference to be engaged by said means, of a core for the shoe, comprising a plurality of segmental holders, and a series of inflated balls mounted in each holder and exposed at the outer circumference thereof, the normal size of the balls being such that they are held under compression by the shoe when the latter is connected with the wheel rim by the clamping means.

3. A wheel rim provided with shoe-attaching means, a shoe held on the wheel rim by said means, a flexible, cellular holder within the shoe, and inflated elastic balls mounted in the cells of the holder and held under pressure by the overlying shoe when the latter is attached to the wheel rim, said balls acting to support the shoe adjacent the tread portion thereof.

4. A shoe core for resilient tires, comprising a holder having a series of ball-receiving pockets open toward the tread side of the shoe, and resilient balls in the pockets to bear directly against the interior surface of the shoe when assembled therewith.

5. In a core for resilient tire shoes, a segmental ball-holder of molded rubber provided with a series of radial cells or pockets having their openings at the longitudinally convex side of the holder.

6. A core for resilient tire shoes, comprising a resilient, segmental holder having a series of radial ball-receiving pockets open at their outer ends adjacent the longitudinally convex side of the holder, and inflated rubber balls seated in the pockets and projecting beyond the open ends thereof.

7. A core for resilient tire shoes, comprising a resilient, segmental holder having a series of radial ball-receiving pockets open at their outer ends, and semi-spherical at their inner ends, and removable inflated balls seated in the semi-spherical portions of the pockets and projecting beyond the outer ends thereof adjacent the peripheral portion of the holder.

8. A core for resilient tire shoes, comprising a resilient, segmental holder having a body portion provided with a row of semi-spherical seats and tubular, flexible extensions projecting outwardly therefrom, to form ball-receiving cells, a solid portion of the body separating adjacent seats, and resilient balls inserted in the cells and resting in the seats, the flexible extensions providing clearance spaces for the balls when distorted by pressure.

9. A core for tire shoes, comprising a holder substantially circular in cross-section and having a row of radial cells open at the outer or tread side of the holder, and a series of resilient balls inserted in the cells and adapted to engage the interior of the shoe adjacent the tread portion thereof.

10. A resilient core for tire shoes, comprising a holding member of rubber provided with raidal cells separated at their outer, open ends, and a series of inflated balls in the cells and projecting beyond the surface of the holding member, to form air spaces between adjacent balls and between the shoe and the outer portion of the holding In testimony whereof, I have signed my name to this specification, in the presence of two subscribing witnesses.

GEORGE OTIS DRAPER.

Witnesses:
  JOHN C. EDWARDS,
  THOMAS J. DRUMMOND.